United States Patent [19]

Takahashi

[11] Patent Number: 5,200,185
[45] Date of Patent: Apr. 6, 1993

[54] METHOD FOR BREEDING POULTRY AND LIVESTOCK WITH SUPERIOR MEAT AND SKIN QUALITY, OR FOR MAINTAINING HEALTHY PETS

[76] Inventor: Shiyushichi Takahashi, 23-2, Sakigaoka 3-chome, Funabashi-shi, Chibaken, 274, Japan

[21] Appl. No.: 752,666

[22] PCT Filed: Dec. 20, 1990

[86] PCT No.: PCT/JP90/01658
§ 371 Date: Oct. 22, 1991
§ 102(e) Date: Oct. 22, 1991

[87] PCT Pub. No.: WO91/09353
PCT Pub. Date: Jul. 11, 1991

[30] Foreign Application Priority Data

Dec. 25, 1989 [JP] Japan ................... 1-332974
May 8, 1990 [JP] Japan ................... 2-116872
May 9, 1990 [JP] Japan ................... 2-119218

[51] Int. Cl.$^5$ .................. A61K 35/78; A23K 1/00
[52] U.S. Cl. .................. 424/195.1; 426/635
[58] Field of Search ............. 424/195.1; 426/635

[56] References Cited

FOREIGN PATENT DOCUMENTS 52-28922 4/1977 Japan.
62-191232 7/1987 Japan.

OTHER PUBLICATIONS

Chem. Abst. 114(1):51162, 1991.

Primary Examiner—John W. Rollins
Attorney, Agent, or Firm—Armstrong, Westerman, Hattori, McLeland & Naughton

[57] ABSTRACT

This invention concerns a method for producing fine, firm, tender and tasty (in case of skin, high in quality) meats and skins of poultry and livestock, for maintaining healthy pets by lowering excess subcutaneous and internal organ fat and for producing pets having a good complexion and hair coat. By this invention, it becomes possible to raise poultry and livestock with superior traits such as "fine texture", "firmness", "tenderness" and "tastiness" (in case of skin, "high quality"), to produce meat and skin comparable to those of wild poultry and game animals as food and/or leather products, to maintain healthy pets by lowering excess subcutaneous and internal organ fat and to produce pets having a good complexion and hair coat.

12 Claims, No Drawings

METHOD FOR BREEDING POULTRY AND LIVESTOCK WITH SUPERIOR MEAT AND SKIN QUALITY, OR FOR MAINTAINING HEALTHY PETS

BACKGROUND OF THE INVENTION

1. Field of the Invention

This invention concerns a method for producing fine, firm, tender and tasty (in case of skin, high in quality) meats and skins of poultry and livestock, for maintaining healthy pets by lowering excess subcutaneous and internal organ fat and for producing pets having good complexion and hair coat through the administration of Tochu, an extract of the bark of *Eucommia ulmoides* Oliver tree, which is native to central and southern China.

2. Description of Related Art

Several deficiencies exist in present breeding methods. For example insufficient exercise for poultry and livestock raised in narrow, confined sheds prevent their meat and skin from achieving "fine texture", "firmness", "tenderness" and "tastiness" (in case of skin, "high quality").

Due to these deficiencies, the meat and skin become tough, coarse and fatty, and generally, they do not meet with public favor as food or leather products. In the case of pets, they are usually raised in a confined home environment as opposed to an unconfined, sunlight-exposed, open-air, natural environment. This leads to insufficient exercise and excess fat accumulation and further makes their complexion, hair coat and body strength deteriorate.

OBJECT AND SUMMARY OF THE INVENTION

The objective of this invention is the qualitative improvement of meat and skin of poultry and livestock raised in sheds, and that of the health of domestic pets.

The existing problems mentioned above are solved by this invention, that is, by administering Tochu to poultry and livestock, as well as to domestic pets.

DESCRIPTION OF PREFERRED EMBODIMENTS

Specifically, this invention concerns a method for producing fine, firm, tender and tasty (in case of skin, high in quality) meats and skins of poultry and livestock, for maintaining healthy pets by lowering excess subcutaneous and internal organ fat and for producing pets having a good complexion and hair coat. By this invention, it becomes possible to raise poultry and livestock with superior traits such as "fine texture", "firmness", "tenderness" and "tastiness" (in case of skin, "high quality"), to produce meat and skin comparable to those of wild poultry and game animals as food and/or leather products, to maintain healthy pets by lowering excess subcutaneous and internal organ fat and to produce pets having a good complexion and hair coat.

In Chinese crude medicine, Tochu refers to a dried substance extracted from the bark of *Eucommia ulmoides* Oliver tree. The word "Tochu" in this invention is limited to its leaves only, and usually implies dry materials, dried or liquid extract. When these dry substances are roasted at approximately 80° to 120° C. for about 0.5 to 2 hours, the odor can be removed. A dry powdered leaf product of *E. ulmoides* Oliver tree is most desirable from the standpoint of both convenience and economy.

In this invention, "poultry" means varieties of fowls such as turkeys, ???, guinea fowls, pheasants, quails, ducks and ostriches, raised by man for the purposes of food, leather, and egg production, and "livestock" means varieties of mammals such as mink, pigs, boars, deer, cows and horses, raised by man for the purposes of food, leather, or fur production. And also, "pets" means varieties of mammals such as mice, rats, hamsters, cats, dogs, mink, pigs, cows and horses, raised by man as domestic pets, for racing, or for livestock production. As to the administration of Tochu, incorporation of the dried powder in the animals' feed is appropriate, and the amount added will be approximately 0.1 to 30% of total volume of the feed. Although the administered dose is not critical and depends on the kind of poultry, livestock and pets, it will be around 0.5 g per kilogram of the feed per day for poultry, livestock and pets. More specifically, the concentration of dry powdered Tochu leaves in the feed is prepared as approximately 1 to 5% w/w, and then the mixed feed is given to the poultry, livestock or pets. The operational examples are given below for poultry, livestock and pets, respectively.

EXAMPLE I

Poultry

One-day old chicks were equally divided into a test group and a control group, and they were raised in individual henhouses. The test group was given standard normal feed with 2.5% (w/w) of the powdered Tochu leaves, while the control group received standard normal feed. After both groups were given the food ad lib. for 60 days, they were anaesthetized, decapitated, and drained of blood. Their abdomen was then opened vertically, intestines were removed, and muscle tissues were collected. These muscles were simply broiled in accordance with a standard culinary method, and they were given to a panel of 24 trained testers ranging in age from 18 to 25 years for the sensory test, in which three different items were evaluated: 1) "firmness", 2) "easiness of swallowing" and 3) "tastiness". It is well known that if meat is of good quality, skin in the same body is also of good quality.

1) Evaluation for "firmness"

As shown in Table 1, "firmness" for the plainly broiled meat was evaluated in three categories of "hard to chew", "ordinary" and "too soft", and the number of testers is indicated as a percentage. The results revealed that a high number of testers (61.1%) ranked the test group as "hard to chew", whereas a low number of testers (16.0%) made this assignment for the control group. On the contrary, a low number of testers (10.5%) evaluated the test group as "too soft", while a high number of testers (40.0%) made this assignment for the control group. This result undoubtedly demonstrated that meat of the test group was tightened and formed fine texture, when compared with the control group.

2) Evaluation for "easiness of swallowing"

As shown in Table 2, "easiness of swallowing" for the plainly broiled meat was evaluated in three categories of "easy to swallow", "ordinary" and "hard to swallow", and the number of testers is indicated as a percentage. The results revealed that a high number of testers (53.8%) ranked the test group as "easy to swallow", whereas a low number of testers (24.6%) made this assignment for the control group. On the contrary, a low number of testers (19.2%) evaluated the test group as "hard to swallow", while a high number of testers (46.2%) made this assignment for the control group. This result clearly exhibited that meat of the test group was tender, when compared with the control group.

3) Evaluation for "tastiness" (Part 1)

As shown in Table 3, "tastiness" for the plainly broiled meat was evaluated in three categories of "good", "ordinary" and "poor", and the number of testers is indicated as a percentage. The results revealed that a high number of testers (50.0%) ranked the test group as "good", whereas 15.4% of testers made this assignment for the control group. On the contrary, a low number of testers (11.5%) evaluated the test group as "poor", while a high number of testers (46.2%) made this assignment for the control group. This result demonstrated that meat of the test group was of good taste, when compared with the control group.

4) Evaluation for "tastiness" (Part 2)

As shown in Table 4, "tastiness" for fried meat was evaluated in three categories of "good", "ordinary" and "poor", and the number of testers is indicated as a percentage. The results revealed that a high number of testers (40.9%) ranked the test group as "good", whereas 36.4% of testers made this assignment for the control group. On the contrary, none of the testers (0%) evaluated the test group as "poor", while 22.5% of testers made this assignment for the control group. This result demonstrated that meat of the test group was of good taste, when compared with the control group.

From the above test results, it was clearly indicated that the method of raising poultry by the mixed feed with Tochu leaf powder contributes to the production of "finer texture", "easier to swallow" and "better tasting" meat and higher-quality skin, relative to the conventional raising method.

EXAMPLE 2

Livestock

Yorkshire pigs, six-months old, whose hair of a middle-side body was shaved in an area of 3 cm square and stained with dancylchloride, fluorescent dye, were equally divided into a test group and a control group, and they were raised in individual sheds. The test group was given standard normal feed with 2.5% (w/w) of the powdered Tochu leaves, while the control group received standard normal feed. After both groups were given the food ad lib. for 4 weeks, they were dissected, and their thigh meat was used for the tests.

These muscles were simply broiled in accordance with a standard culinary method, and they were given to a panel of 24 trained testers ranging in age from 18 to 25 years for the sensory test. Furthermore, the intensity of fluorescence on skin, dyed with dancylchloride, was measured during the feeding period. The evaluation was conducted using three different items of 1) "firmness", 2) "easiness of swallowing" and 3) "tastiness".

1) Evaluation for "firmness"

As shown in Table 5, "firmness" for the plainly broiled meat was evaluated in three categories of "hard to chew", "ordinary" and "too soft", and the number of testers making each assignment is indicated as a percentage. The results revealed that a high number of testers (70.2%) ranked the test group as "hard to chew", whereas a low number of testers (20.3%) made this assignment for the control group.

On the contrary, a low number of testers (11.9%) evaluated the test group as "too soft", while a high number of testers (60.3%) made this assignment for the control group. This result undoubtedly demonstrated that meat of the test group was tightened and formed fine texture, when compared with the control group.

2) Evaluation for "easiness of swallowing"

As shown in Table 6, "easiness of swallowing" for the plainly broiled meat was evaluated in three categories of "easy to swallow", "ordinary" and "hard to swallow", and the number of testers is indicated as a percentage. The results revealed that a high number of testers (60.0%) ranked the test group as "easy to swallow", whereas a low number of testers (24.6%) made this assignment for the control group. On the contrary, a low number of testers (17.2%) evaluated the test group as "hard to swallow", while a high number of testers (46.9%) made this assignment for the control group. This result clearly exhibited that meat of the test group was tender, when compared with the control group.

3) Evaluation for "tastiness"

As shown in Table 7, "tastiness" for the plainly broiled meat was evaluated in three categories of "good", "ordinary" and "poor", and the number of testers is indicated as a percentage. The results revealed that a high number of testers (58.0%) ranked the test group as "good", whereas a low number of testers (12.4%) made this assignment for the control group. On the contrary, none of the testers (0%) evaluated the test group as "poor", while a high number of testers (47.5%) made this assignment for the control group. This result demonstrated that meat of the test group was of good taste, when compared with the control group.

From the above test results, it was clearly demonstrated that the method of raising livestock by mixing the feed with Tochu leaf powder contributes to the production of "finer texture", "easier to swallow" and "better tasting" meat and higher-quality skin as compared with the conventional raising method.

4) Evaluation of skin quality

As shown in Table 8, the diminution rate of the fluorescence observed with dancylchloride dyed skin reflects the turnover rate of the horny layer. It has been confirmed by scientific research that the skin turnover rate is related to its age, and the rate is faster for younger skin and decreases with aging.

Compared with that of old animals, younger skin has good qualities like fine texture, firmness and suppleness. Therefore, it usually receives higher appreciation than skin of animals of advanced age. In this experiment, the diminution rate of the fluorescence in the horny layer was three times faster in the test group than in the control group. This proves that the test group maintained its youth more and possessed higher-quality skin, with "fine texture", "firmness" and "suppleness", compared with the control group.

EXAMPLE 3

Pets (mice)

40-Week old mice were equally divided into a test group and a control group, and they were raised in individual cages. The test group was given standard normal feed supplemented with 2.5% (w/w) powdered Tochu leaves, while the control group received standard normal feed. After both groups were given the food ad lib. for 30 days, their complexion, hair coat and health condition were observed. After that, they were anesthetized, decapitated, and drained of blood. Their abdomen was then opened, and the condition of the subcutaneous and internal organ fat accumulation was examined.

In this test, three parameters, 1) complexion and hair coat, 2) fat level and 3) healthy degree, were evaluated as follows. The number of mice tested was 30 in each group.

1) Evaluation of complexion and hair coat

As shown in Table 9, the quality of the complexion and hair coat in the forehead, head, back and body parts of mice were evaluated in three categories of "good", "ordinary" and "bad", and the number of mice is indicated as a percentage. For the test group, the results revealed that 90% of the mice were ranked as "good", 10% as "ordinary" and none (0%) as "bad". For the control group, none of the mice (0%) were ranked as "good", 70% as "ordinary" and 30% as "bad".

This result obviously suggested that the quality of complexion and hair coat of the test group were superior to those of the control group. It was evident that mice became healthier and their complexion and hair coat were greatly improved by the administration of Tochu. These values were assigned by four experts and evaluated by average values.

2) Measurement of subcutaneous and internal organ fat

After the mice were dissected, the subcutaneous and internal organ fat was immediately removed, and the weight of the total fat was determined. The average weight of fat was 0.60 g for the test group and 1.78 g for the control group. Over a period of 30 days, the bodies of the mice in the test group became firmer than those in the control group.

3) Judgement of degree of health

As shown in Table 10, mice were divided into a test group and a control group to examine the degree of health. As an indication of the health, a running test was conducted for each group. The test was conducted 6 times during eleven days, 200 sec each time, using a treadmill device* with belt speed of 25 m/min. By the standard of evaluation below, the degree of health was determined.

* Note—Electric current (20–50 mV) was run on the floor adjacent to the back wall (area E) of the treadmill. If an animal does not run on the moving conveyor belt, it will be carried back to the area E and get an electric shock. To avoid the shock, it has to run forward. When the animal gets tired, the number of contacts with the area E will increase. When it finally loses its strength to avoid the shock, it will just stay at area E due to its fatigue.

Standard of evaluation for a running test
5 points: never touched area E
4 points: touched area E twice
3 points: touched area E three times
2 points: touched area E five times
1 point: rode on area E more than three times (usually, no running after riding on area E)

The numerical values are summarized in Table 10. The values are the total points of 30 mice in each group. The average points of 6 tests was 111.6 for the test group and 78.3 for the control group. The test group exhibited a 29.8% higher value than the control group. This result demonstrated that the physical ability of the test group was higher than that of the control group. It was also clear that the test group was healthier than the control group.

From the above test results, it was clearly indicated that the method of raising pets by feeding diet supplemented with Tochu leaf powder produces better complexion and hair coat, decreases excess subcutaneous and internal organ fat, and maintains better health, relative to the conventional feeding method.

By raising poultry with food supplemented with Tochu leaf powder, the characteristics of "fine texture", "firmness", "tenderness" and "tastiness", can be obtained, as compared with those raised by the conventional method.

By raising livestock with food supplemented with Tochu leaf powder, the characteristics of "fine", "firm", "tender" and "tasty" (in case of skin "high in quality") meats and skins, can be produced, as compared with those raised by the conventional method.

By maintaining pets with food supplemented with Tochu leaf powder, they develop a better complexion and hair coat, excess subcutaneous and internal organ fat is reduced, and better health is maintained, relative to pets raised by the conventional method.

TABLE 1

EVALUATION FOR 'FIRMNESS' OF PLAINLY BROILED FOWL

|  | HARD TO CHEW | ORDINARY | TOO SOFT |
| --- | --- | --- | --- |
| TEST GROUP | 61.1% | 28.4% | 10.55% |
| CONTROL GROUP | 16.0% | 44.4% | 40.00% |

TABLE 2

EVALUATION FOR 'EASINESS OF SWALLOWING' OF PLAINLY BROILED FOWL

|  | EASY TO SWALLOW | ORDINARY | HARD TO SWALLOW |
| --- | --- | --- | --- |
| TEST GROUP | 53.8% | 27.0% | 19.2% |
| CONTROL GROUP | 24.6% | 29.0% | 46.2% |

TABLE 3

EVALUATION FOR 'TASTINESS' OF PLAINLY BROILED FOWL

|  | GOOD | ORDINARY | POOR |
| --- | --- | --- | --- |
| TEST GROUP | 50.0% | 38.5% | 11.5% |
| CONTROL GROUP | 15.4% | 38.4% | 46.2% |

TABLE 4

EVALUATION FOR 'TASTINESS' OF FRIED FOWL

|  | GOOD | ORDINARY | POOR |
| --- | --- | --- | --- |
| TEST GROUP | 40.9% | 59.1% | 0.0% |
| CONTROL GROUP | 36.4% | 41.1% | 22.5% |

TABLE 5

EVALUATION FOR 'FIRMNESS' OF PLAINLY BROILED PORK

|  | HARD TO CHEW | ORDINARY | TOO SOFT |
| --- | --- | --- | --- |
| TEST GROUP | 72.2% | 15.9% | 11.9% |
| CONTROL GROUP | 20.3% | 19.4% | 60.33% |

TABLE 6

EVALUATION FOR 'EASINESS OF SWALLOWING' OF PLAINLY BROILED PORK

|  | EASY TO SWALLOW | ORDINARY | TOO SOFT |
| --- | --- | --- | --- |
| TEST | 60.0% | 22.8% | 17.2% |

TABLE 6-continued

EVALUATION FOR 'EASINESS OF SWALLOWING' OF PLAINLY BROILED PORK

| | EASY TO SWALLOW | ORDINARY | TOO SOFT |
|---|---|---|---|
| GROUP CONTROL GROUP | 24.6% | 28.5% | 46.9% |

TABLE 7

EVALUATION FOR 'TASTINESS' PLAINLY BROILED PORK

| | GOOD | ORDINARY | POOR |
|---|---|---|---|
| TEST GROUP | 58.0% | 42.0% | 0.0% |
| CONTROL GROUP | 12.4% | 40.1% | 47.5% |

TABLE 8

EVALUATION FOR 'SKIN QUALITY' BY DANCYLCHLORIDE DYED SKIN (FASTER DIMINUATION OF THE FLOURESCENT CORRESPONDS TO YOUNG AND GOOD QUALITY OF SKIN)

| | TEST GROUP n = 10 | | CONTROL GROUP n = 10 | |
|---|---|---|---|---|
| | NBR. DIMINISHED | NBR. REMAINED | NBR. DIMINISHED | NBR. REMAINED |
| 1 WEEK | 2 | 8(XXX) | 0 | 10(XXXX) |
| 2 WEEK | 4 | 6(XX) | 0 | 10(XXX) |
| 3 WEEK | 10 | 0(X) | 4 | 6(XX) |

XXXX - CLEARLY DARK
XXX - DARK
XX - THIN
X - DIMINISHED

TABLE 9

EVALUATION FOR 'COMPLEXION AND HAIR COAT' (THE PERCENTAGE INDICATES APPLIED ANIMALS)

| | GOOD | ORDINARY | NONE |
|---|---|---|---|
| TEST n = 30 | 90% | 10% | 0% |
| CONTROL = 30 | 0% | 70% | 30% |

TABLE 10

EVALUATION FOR 'DEGREE OF HEALTH' BY TREADMIL DEVICE (HIGHER POINTS INDICATE HIGHER STAYING POWER)

| | 1ST | 2ND | 7TH | 8TH | 9TH | 10TH | Average |
|---|---|---|---|---|---|---|---|
| TEST n = 30 | 102 | 105 | 112 | 112 | 117 | 119 | 111.6 |
| CONTROL = 30 | 102 | 75 | 75 | 78 | 72 | 71 | 78.3 |

I claim:

1. A method of raising and maintaining the health of an animal selected from the group consisting of mammals and poultry, comprising feeding said animal a composition comprising animal feed and about 0.1 to 30% Eucommia ulmoides Oliver leaves based on volume of said feed.

2. The method of claim 1, wherein about 0.5 g of said Eucommia ulmoides Oliver leaves per kilogram of feed is administered to said animal per day.

3. The method of claim 1, wherein said animal is selected from the group consisting of poultry and livestock.

4. The method of claim 1, wherein said animal is selected from the group consisting of dogs and cats.

5. A method of lowering excess subcutaneous and internal organ fat in an animal, comprising administering a composition comprising animal feed and about 0.1 to 30% Eucommia ulmoides Oliver leaves based on total volume of said feed.

6. The method of claim 5, wherein about 0.5 g of said Eucommia ulmoides Oliver leaves per kilogram of animal feed is administered to said animal per day.

7. The method of claim 5, wherein said animal is selected from the group consisting of poultry, livestock and pets.

8. The method of claim 5, wherein said animal is selected from the group consisting of dogs and cats.

9. A composition comprising a feed for mammals or poultry and 0.1 to 30% Eucommia ulmoides Oliver leaves based on total volume of said feed.

10. The composition of claim 9, wherein said feed is poultry feed.

11. The composition of claim 9, wherein said feed is livestock feed.

12. The composition of claim 9, wherein said feed is one of dog and cat feed.

* * * * *